(12) United States Patent
Zhang

(10) Patent No.: US 6,688,499 B2
(45) Date of Patent: Feb. 10, 2004

(54) LIQUID DISPENSER WITH SCREW PUMP

(76) Inventor: Jie Zhang, 1075 Laurian Park Dr., Roswell, GA (US) 30075

( * ) Notice: Subject to any disclaimer, the term of this patent is extended or adjusted under 35 U.S.C. 154(b) by 89 days.

(21) Appl. No.: 10/132,106

(22) Filed: Apr. 25, 2002

(65) Prior Publication Data

US 2003/0201285 A1 Oct. 30, 2003

(51) Int. Cl.⁷ .................................................. G01F 11/22
(52) U.S. Cl. ...................... 222/413; 222/63; 222/181.3; 222/325; 222/333; 222/482
(58) Field of Search ............................... 222/63, 181.1, 222/181.2, 181.3, 325, 333, 413, 481.5, 482

(56) References Cited

U.S. PATENT DOCUMENTS

| | | | | |
|---|---|---|---|---|
| 2,605,021 A | * | 7/1952 | Churchill et al. | 222/153.03 |
| 3,840,154 A | * | 10/1974 | Speak | 222/181.2 |
| 4,489,857 A | * | 12/1984 | Batlas | 222/179 |
| 5,255,822 A | * | 10/1993 | Mease et al. | 222/63 |
| 6,460,734 B1 | * | 10/2002 | Schroeder et al. | 222/129.1 |

* cited by examiner

Primary Examiner—Gene Mancene
Assistant Examiner—Patrick Buechner
(74) Attorney, Agent, or Firm—John L. James

(57) ABSTRACT

A liquid dispenser operates automatically when a hand is present. The dispenser has a screw mounted on a bottle cap housing that turns to pump liquid from an inverted bottle. The screw is turned by a sensor activated motor. A valve opens to allow air to enter the bottle to replace the volume of soap dispensed.

20 Claims, 4 Drawing Sheets

LIQUID DISPENSER WITH SCREW PUMP

TECHNICAL FIELD OF THE INVENTION

This invention relates to a liquid dispenser and pump for a dispenser for dispensing liquids such as soap and chemical agents and reagents.

BACKGROUND OF THE INVENTION

Common liquid dispensers, such as soap dispensers found in commercial buildings and establishments, are manually operated. The user typically pulls or pushes a lever opening a passageway from the liquid reservoir. Unfortunately, liquid often flows after the lever is released not only wasting liquid but creating unsightly puddles and splashes of liquid on fixtures and cabinetry. Reservoirs can be rigid plastic bottles or collapsible bags. Rigid bottles require a vent, which may be in the form of an opening in the bottom of the bottle, so all the liquid can be removed for use. Loading bottles in the dispenser with the vent open is sometimes tricky because liquid can flow when the vent is open. Collapsible bags sometimes bind causing a malfunction and often do not empty completely not only wasting liquid but decreasing service intervals as well. It is desirable to use a rigid bottle because bottles are relatively easy to handle and empty more completely than bags, and are not as susceptible to puncture or tearing.

In some establishments lavatory water flow is controlled by a sensor that turns the water on when a hand is present under the faucet. When the hand is removed, or after a predetermined period of time, the flow stops. A motor opens and closes the valves controlling water flow. Practical motors for use with sensors do not provide the motion required to operate the levers on typical soap dispensers. Accordingly, it will be appreciated that it would be highly desirable to have a pump for a soap dispenser that uses the rotational motion of a sensor activated motor to deliver a measured amount of liquid.

In laboratory and industrial settings, chemicals and other liquids are bought and stored in large volumes because it is economical to do so on a unit basis, but they are used in very small quantities. Removing a small quantity of material from a large container exposes the bulk material to contamination and deterioration from exposure to air. Also, trying to remove a small quantity from a large container, increases the risk of spills. It is desirable to dispense a s mall a mount of material as needed without exposing the bulk material to air or increasing the risk of contamination.

SUMMARY OF THE INVENTION

The present invention is directed to overcoming one or more of the problems set forth above. Briefly summarized, according to one aspect of the invention, a liquid dispenser comprises a housing, an inverted bottle mounted on the housing and a cap on the bottle inside the housing. The cap defines an exit port for liquid to flow from the bottle and an entrance port for air to flow through the cap to the bottle. A screw housing is attached to the cap and defines a dispensing spout. A screw is mounted in the screw housing with the s crew transporting liquid from the cap to the dispensing when the screw rotates.

According to another aspect of the invention, a liquid dispenser comprises an inverted bottle, a cap, means for attaching the cap to the bottle, a pump disposed in the cap, and means for activating the pump. The pump includes a screw that pumps the liquid from one place to another instead of merely opening a passageway for the liquid to flow through with the assistance of gravity.

The screw has a flange on one end portion adapted to control liquid flow through the exit port by deforming when the screw rotates to allow liquid to flow out of the housing through the exit port. As liquid is carried by the screw, the liquid is pressurized sufficiently to deform the plastic flange. When the screw stops turning, the pressure is released and the flange regains its shape to block liquid flow out of the housing through the exit port.

A valve in the entrance port in the cap controls air flow through the entrance port. Air controlled by the valve replaces the dispensed liquid to equalize pressure so the liquid can flow without collapsing the bottle. The bottle is rigid to resist collapse as the liquid is pumped out of it. To prevent collapse, air is introduced into the bottle as liquid is removed via a valve which controls air flow. The screw operates for a brief period when activated to deliver a measured amount of liquid.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
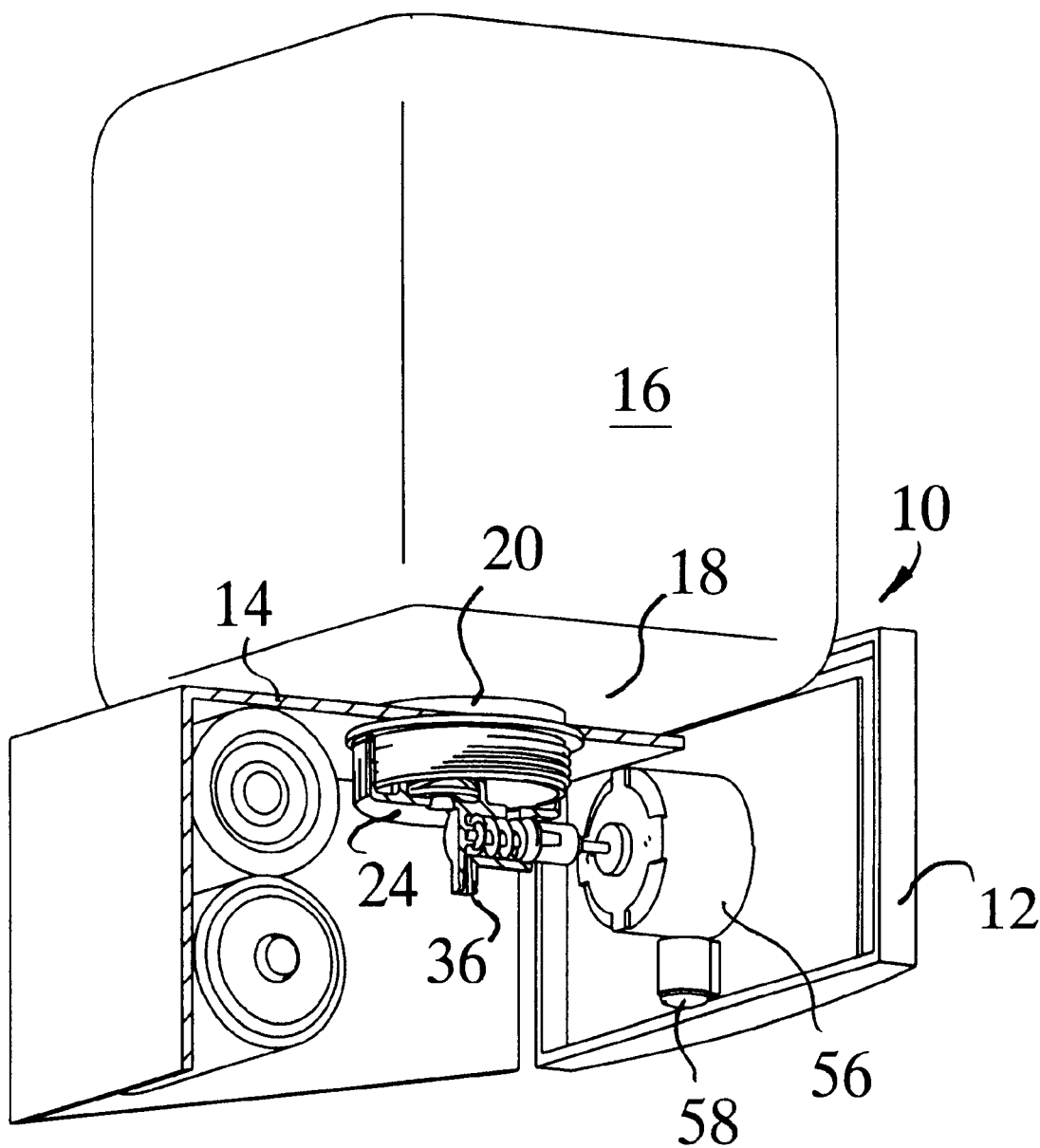
FIG. 1 is a perspective view of a preferred embodiment of a liquid dispenser with a portion of the housing removed according to the present invention.
Figure 2:
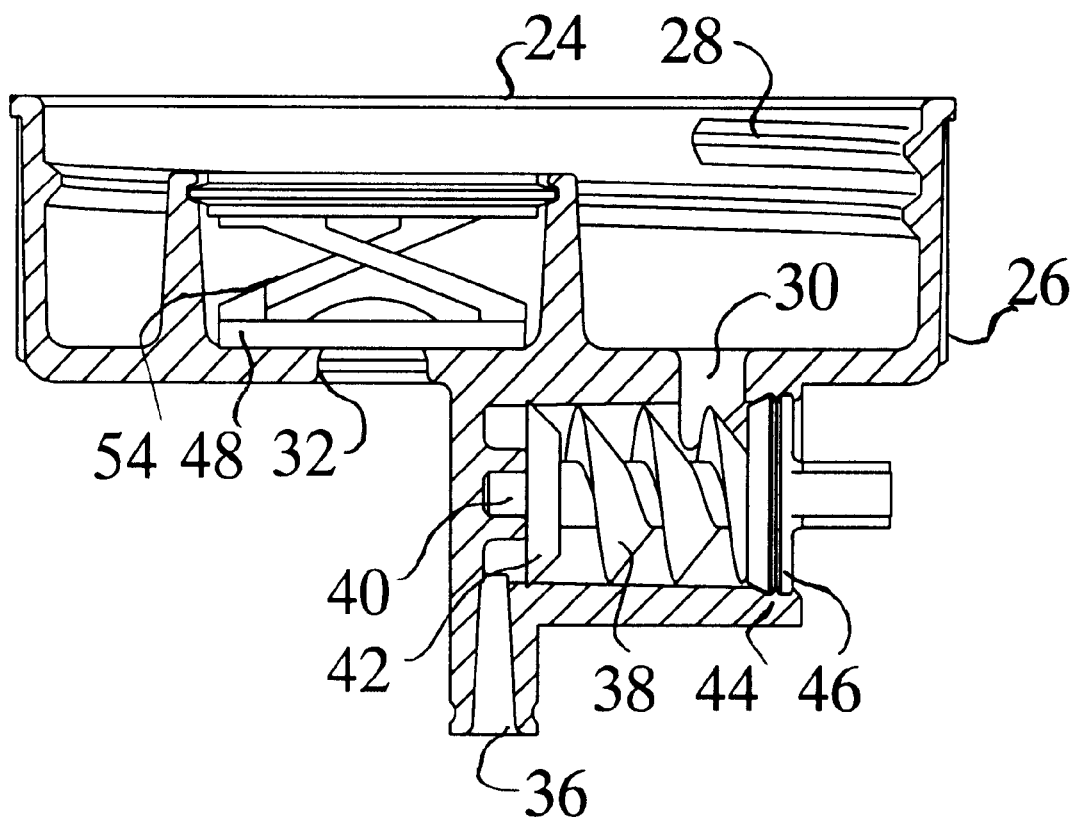
FIG. 2 is sectional view of the cap and pump of the liquid dispenser of FIG. 1.
Figure 3:
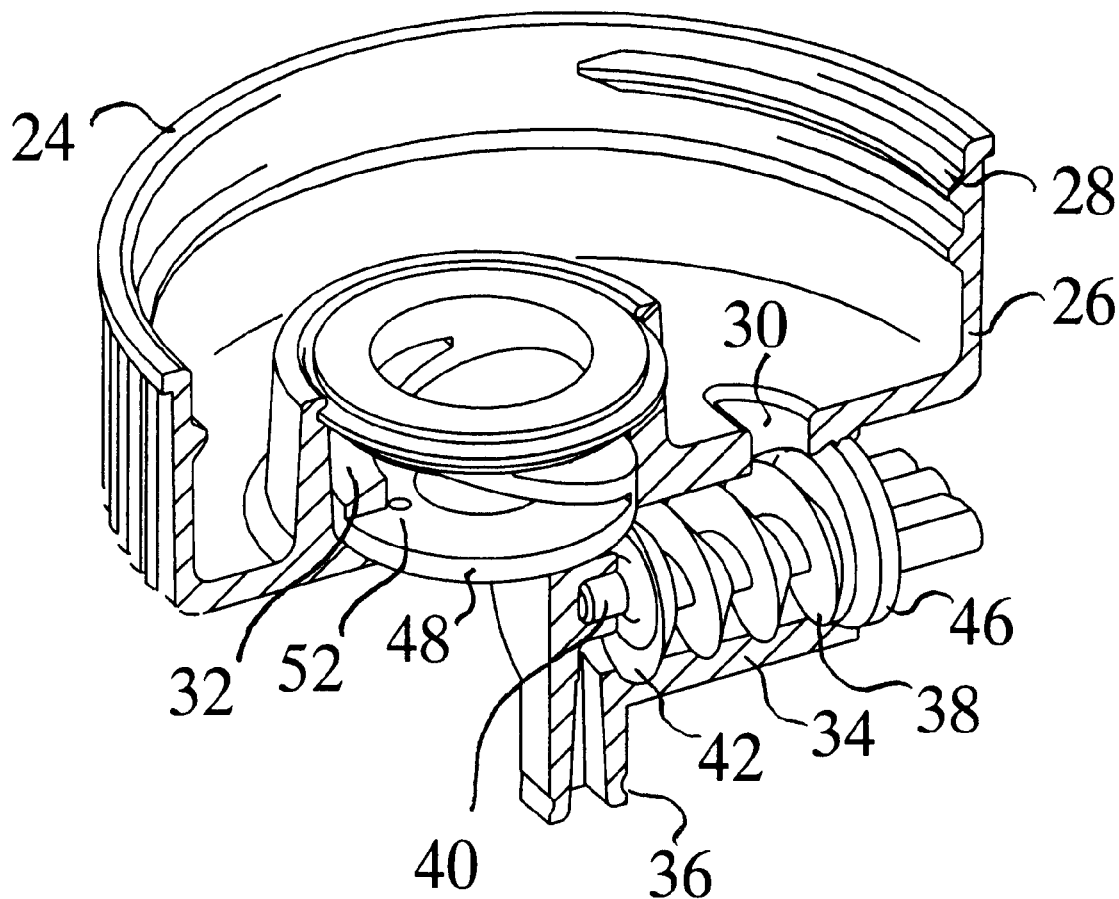
FIG. 3 is sectional view similar to FIG. 2 but at a different angle to illustrate the air passageway.
Figure 4:
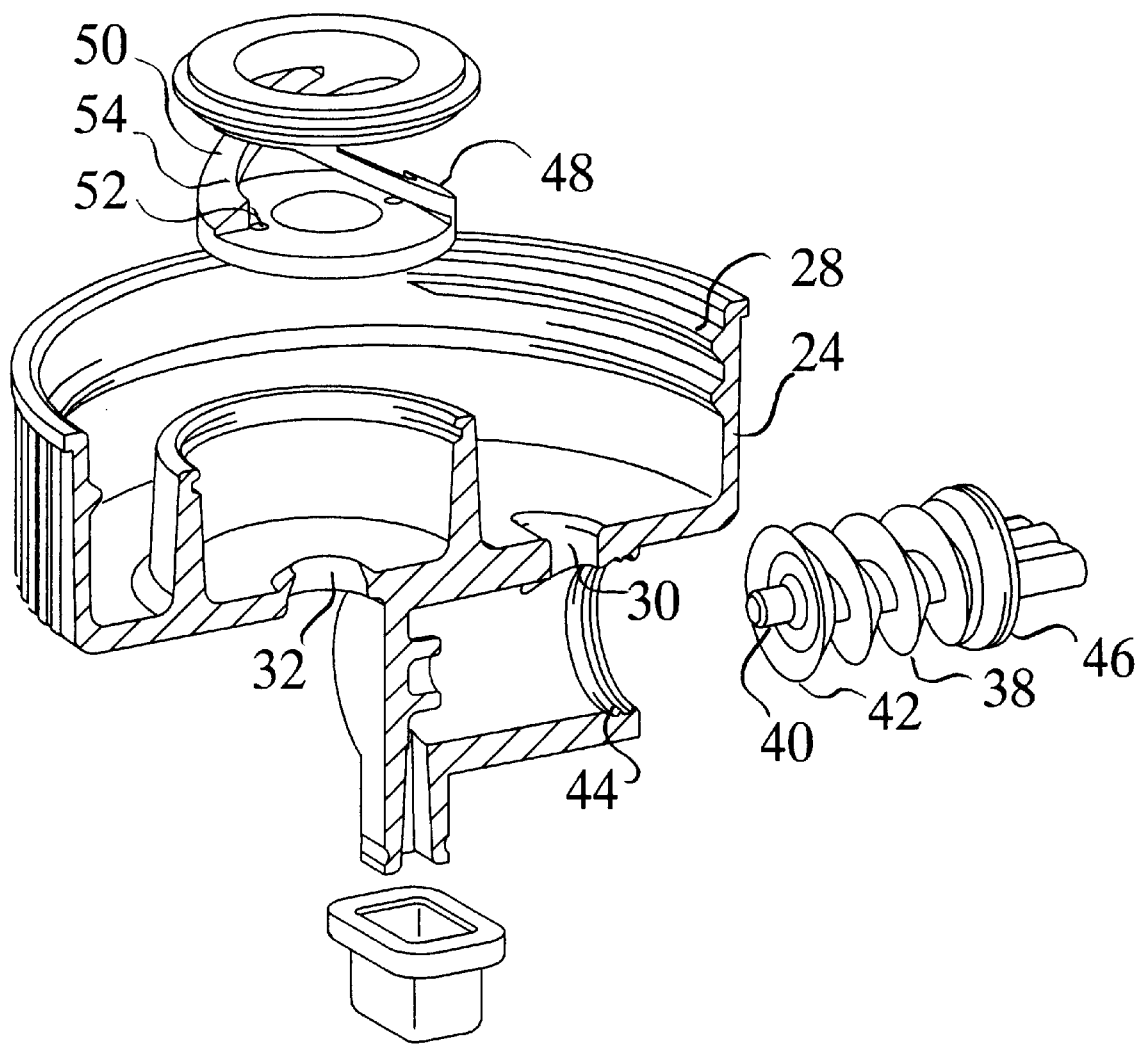
FIG. 4 is an exploded view of the cap and pump illustrating the pump screw.

Referring to FIGS. 1–4, a liquid dispenser 10, for dispensing soap or chemicals for example, has a dispenser housing 12. Housing 12 and dispenser 10 are preferably constructed of plastic. Dispenser housing 12 may be fastened to a wall, bench or other mounting structure using screws, adhesive or other fasteners. The dispenser housing is a permanent member of the dispenser to be used with several replacement bottles and caps. It has a side member that attaches to the mounting structure and a top member 14 with an opening. The side member hangs from the top member like a skirt.

A bottle 16 is mounted on the top member 14 of the dispenser housing 12 over the opening in the top member. Bottle 16 has a bottom portion 18 and a neck 20 with external threads. Neck 20 protrudes through the opening in the top member 14 so that the shoulder of bottle 16 rests on top member 14. Bottle 16 is inverted with bottom portion 18 pointing upward and neck 20 pointing downward.

A cap 24 for bottle 16 has a hollow ring 26 with internal threads 28 that mate with external threads of bottle neck 20. Cap 24 attaches to bottle 16 inside dispenser housing 12 and overlays the opening in top member 14 so that bottle 16 cannot be removed while cap 24 is attached. Cap 24 defines an exit port 30 for liquid to flow from bottle 16. Cap 24 also defines an entrance port 32 for air to flow through cap 24 to bottle 16. The air replaces the volume of dispensed liquid in the bottle to prevent bottle collapse.

A screw housing 34 is attached to the cap 24 and defines a dispensing spout 36 through which the dispensed liquid exits the dispenser. Screw pump 38 is mounted in the screw housing 34. Screw 38 transports liquid from the cap 24 to the dispensing spout 36 when the screw rotates. Air flows through the entrance port to replace the volume of liquid in the bottle pumped out by the screw. The screw 38 has a hub 40 with a first end portion mounted in the screw housing 34 and a protruding second end portion. Screw 38 has a flange 42 on the first end portion adapted to control liquid flow through the dispensing spout 36. Flange 42 deforms when the screw rotates to allow liquid to flow out of the housing through the exit port. The pressure of the liquid on the flange as the screw turns causes the flange to deform, and when the pressure is released, the flange regains its original configuration. The screw housing 34 has a groove 44 and the screw 38 has a land 46. The land 46 rotates in the groove 44 when the screw rotates. The screw is adapted to gather liquid from the exit port in the cap and force the liquid out the dispensing spout.

The threads of the screw 38 pick up liquid from the neck 20 of the bottle through exit port 30 and transports the liquid to dispensing spout 36 when the screw rotates. Along the route the liquid is confined between the screw threads and the screw housing and continues the journey to the dispensing spout while the screw is turning. Because the liquid is confined, it will pressurize if the exit port path is blocked because the turning screw continually forces the liquid toward the spout.

A valve 48 in the entrance port 32 in the cap 24 controls air flow through the entrance port 32. The valve 48 includes a valve plate 50 that has one or more openings 52 and a spring 54 biasing the valve plate 50 to a closed position at which the valve plate 50 seats against the cap 24 blocking air flow through the valve plate opening 52. The valve 48 is preferably a unitary structure formed of plastic with an integral plastic spring. This one way valve moves upward slightly in the entrance port 32 to permit air to enter and moves downward to prevent air from escaping. The valve plate is actually forced upward by a pressure differential when the screw pump operates because the pump removes liquid from the bottle causing a pressure drop in the air space at the inverted bottom of the bottle. The higher atmospheric pressure forces the flap to open against the lowered pressure inside the bottle and the force exerted by the spring.

Screw pump 38 is coupled to a motor 56 that is activated by a sensor 58. Sensor 58 is preferably an infrared sensor that detects when a hand or liquid collection vessel is under the dispensing spout 36. Sensor 58 activates motor 56 which provides rotational motion for screw pump 38. To conserve liquid, during each operation, the pump is activated for a preselected period of time sufficient to pump a predetermined amount of liquid.

It can now be appreciated that a liquid dispenser comprises an inverted bottle; a cap, means for attaching the cap to the bottle, a pump disposed in the cap, and means for activating the pump. The pump for the liquid dispenser comprises a housing and a screw mounted in the housing. The housing has a first passageway for receiving liquid to be dispensed, a second passageway for receiving air to replace the volume of liquid dispensed, an exit port for dispensing the liquid, and an access port. The screw is accessible via the access port and transports liquid from the first passageway to the exit port when the screw rotates While the invention has been described with particular reference to the preferred embodiments, it will be understood by those skilled in the art that various changes may be made and equivalents may be substituted for elements of the preferred embodiments without departing from invention. It is accordingly intended that the claims shall cover all such modifications and applications as do not depart from the true spirit and scope of the invention.

What is claimed is:

1. A liquid dispenser, comprising:

a dispenser housing;

an inverted bottle mounted on said dispenser housing and having a bottom portion and a neck with external threads;

a cap having a hollow ring, said ring having internal threads mating with said external threads of said bottle inside said dispenser housing, said cap defining an exit port for liquid to flow from said bottle and an entrance port for air to flow through said cap to said bottle;

a screw housing attached to said cap and defining a dispensing spout; and a screw mounted in said screw housing, said screw transporting liquid from said cap to said dispensing spout when said screw rotates.

2. A liquid dispenser, as set forth in claim 1, wherein air flows through said entrance port to replace the volume of liquid in said bottle pumped out by said screw.

3. A liquid dispenser, as set forth in claim 1, including a valve in said entrance port in said cap to control air flow through said entrance port.

4. A liquid dispenser, as set forth in claim 3, wherein said valve includes a valve plate having an opening and a spring biasing said valve plate to a closed position at which said valve plate seats against said cap blocking air flow through said valve plate opening.

5. A liquid dispenser, as set forth in claim 1, wherein said screw has a hub with a first end portion mounted in said screw housing and a protruding second end portion.

6. A liquid dispenser, as set forth in claim 5, wherein said screw has a flange on said first end portion adapted to control liquid flow through said dispensing spout, said flange deforming when said screw rotates to allow liquid to flow out of said screw housing through said exit port.

7. A liquid dispenser, as set forth in claim 1, wherein said screw housing has a groove and said screw has a land, said land rotating in said groove when said screw rotates, said screw being adapted to gather liquid from said exit port in said cap and force the liquid out said dispensing spout.

8. A liquid dispenser, comprising:

an inverted bottle;

a cap;

means for attaching said cap to said bottle;

a pump disposed in said cap; and means for activating said pump.

9. A liquid dispenser, as set forth in claim 8, wherein said cap has a hollow ring, a neck attached to said ring and a dispenser housing attached to said neck, said cap defining an exit port for liquid to flow from said bottle and an entrance port for air to flow to said bottle.

10. A liquid dispenser, as set forth in claim 9, including a valve in said cap to control air flow through said entrance port.

11. A liquid dispenser, as set forth in claim 10, wherein said valve includes a valve plate having an opening and a spring biasing said valve plate to a closed position at which said valve plate seats against said cap blocking air flow through said valve plate opening.

12. A liquid dispenser, as set forth in claim 8, wherein said pump includes a screw housing attached to said cap and defining a dispensing spout, and a screw mounted in said mounted in said screw housing, said screw transporting liquid from said cap to said spout when said screw rotates.

13. A liquid dispenser, as set forth in claim 12, wherein said screw has a hub with a first end portion mounted in said screw housing and a protruding second end portion.

14. A liquid dispenser, as set forth in claim 13, wherein said screw has a flange on said first end portion adapted to control liquid flow through said dispensing spout, said flange deforming when said screw rotates to allow liquid to flow out of said screw housing through said exit port.

15. A liquid dispenser, as set forth in claim 12, wherein said screw housing has a groove and said screw has a land, said land rotating in said groove when said screw rotates, said screw being adapted to gather liquid from said exit port in said cap and force the liquid out said dispensing spout.

16. A liquid dispenser, as set forth in claim 12, wherein said means for activating said pump engages said screw.

17. A pump for a liquid dispenser, comprising:
a housing having a first passageway for receiving liquid to be dispensed, a second passageway for receiving air to replace the volume of liquid dispensed, an exit port for dispensing the liquid; and
a screw mounted in said housing, said screw transporting liquid from said cap to said dispensing spout when said screw rotates.

18. A pump, as set forth in claim 17, including a valve in said second passageway to control air flow through said entrance port.

19. A pump, as set forth in claim 17, wherein said screw has a flange on one end portion adapted to control liquid flow through said exit port by deforming when said screw rotates to allow liquid to flow out of said housing through said exit port.

20. A pump, as set forth in claim 17, wherein said housing has a groove and said screw has a land, said land rotating in said groove when said screw rotates, said screw being adapted to gather liquid from said cap and force the liquid out said exit port.

* * * * *